April 20, 1965 R. FRIEDMAN 3,179,811
ELECTRONIC SYSTEM FOR CONTROL OF DIRECT CURRENT POWER
Filed Oct. 31, 1962
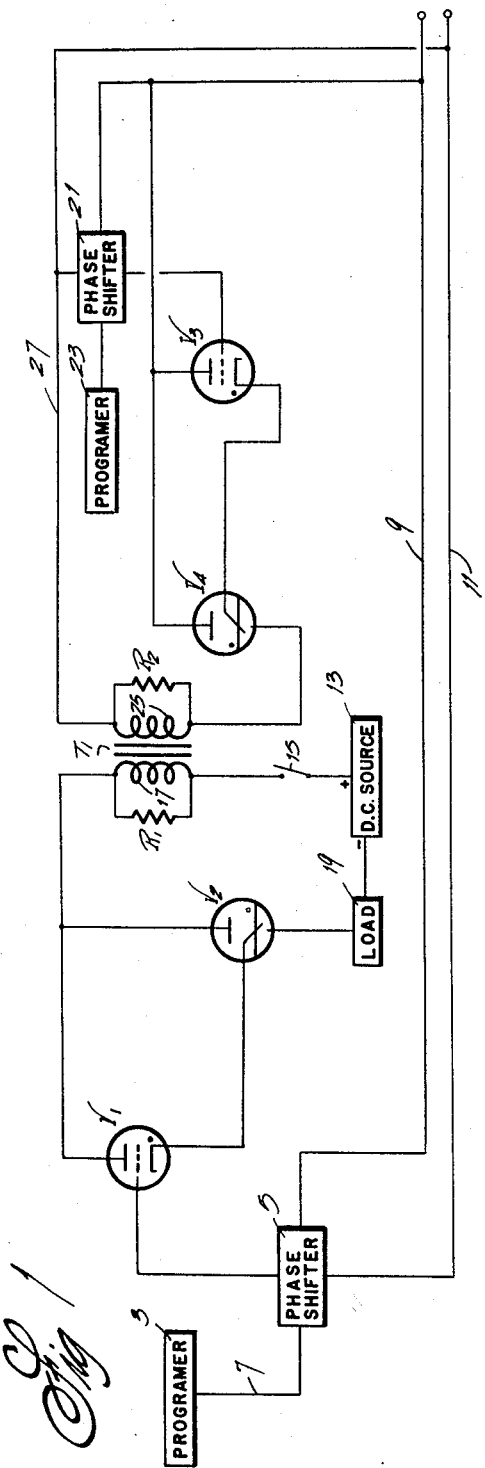
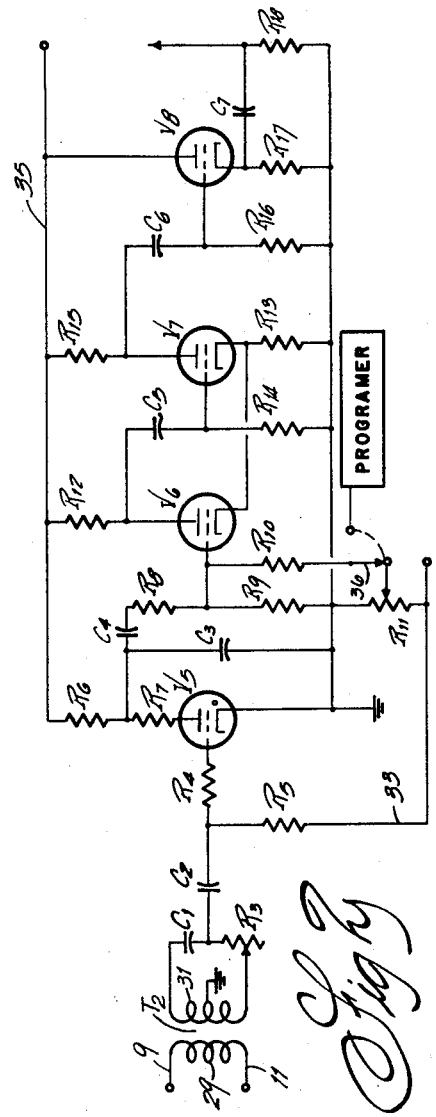
INVENTOR.
RICHARD FRIEDMAN
BY
*Arthur M. Collins*
ATTORNEY

United States Patent Office 3,179,811
Patented Apr. 20, 1965

3,179,811
ELECTRONIC SYSTEM FOR CONTROL OF
DIRECT CURRENT POWER
Richard Friedman, 8276 Fayette St., Philadelphia, Pa.
Filed Oct. 31, 1962, Ser. No. 234,914
6 Claims. (Cl. 307—56)
(Granted under Title 35, U.S. Code (1952), sec. 266)

The invention described herein may be manufactured and used by or for the Government of the United States of America for governmental purposes without the payment of any royalties therein or therefor.

This application is a continuation-in-part of application Serial Number 34,597, filed June 7, 1960.

This invention relates generally to regulated power supplies, and more particularly to the electronic control of direct current power of large magnitudes for relatively short periods of time.

Conventional methods for controlling large amounts of power electronically ordinarily involve the use of alternating current. There are decided disadvantages however in using such a power source to obtain large quantities, i.e. 30,000–50,000 kilovoltamperes, of power for short periods of time. These lie chiefly in the cost of installation of equipment, and the enormous waste of stand-by power capacity caused by the large demand for such a short period of time. D.C. power sources are generally not used because the control of D.C. power heretofore has been by motor control of generator fields or by means of circuit breakers and carbon pile rheostats in series with storage batteries which provide slow control rates and wasteful results if a large demand for a short period of time is required.

It is an object of my invention to provide apparatus for providing electronic control of high energy direct current power so that control can be effected from low signal level function generators or closed-loop programmers.

Another object of my invention is to provide apparatus which is easy to install and remove to different locations.

Yet another object is to provide a system which permits rapid electronic control of D.C. power by a manual or automatic programmer.

A still further object is to provide a system which enables a 360° phase shift to control the firing of a discharge device and a system which contains provision for applying two independent control variables to monitor power and in effect produce a computer function.

More specifically stated, it is an object of my invention to provide apparatus that shall utilize a direct current power source with high efficiency and with as little power loss as possible to provide electronic control of power by means of a series of periodic current impulses of large magnitude and short duration.

Other objects and many of the attendant advantages of this invention will be readily appreciated as the same becomes better understood by reference to the following detailed description which is considered in connection with the accompanying drawing wherein:

FIG. 1 illustrates in schematic circuit diagram the basic circuit of a preferred embodiment of the present invention.

FIG. 2 is a detailed circuit diagram of the phase shifter shown in FIG. 1.

A preferred embodiment of the invention is illustrated in FIG. 1 of the drawing. As shown therein, the programmer circuit or the like 3 which may be of any suitable conventional design is coupled to the phase shift circuit 5 through conductor 7. The phase shifter 5 is also energized by the 60 cycle A.C. reference voltage on conductors 9 and 11. The output circuit of phase shifter 5 is coupled to the control grid of thyratron V-1. The plate circuit of thyratron V-1 extends from the positive terminal of D.C. source 13 successively through manual switch 15, the parallel arrangement of the thyrite varistor R-1 and winding 17 of transformer T-1, the plate-cathode circuit of the thyratron V-1, the grid-cathode circuit of ignitron V-2, and load 19 to the negative terminal of source 13. The plate circuit of ignitron V-2 extends from the positive terminal of source 13 successively through manual switch 15, the parallel arrangement of varistor R-1 and winding 17 of transformer T-1, the tube itself and load 19 to the negative terminal of source 13.

The phase shifter 21 is energized by the programmer circuit 23 which may be similar in design to phase shifter 5 and by the 60 cycle A.C. reference signal on conductors 9 and 11. The output circuit of phase shifter 21 is coupled to the control grid of thyratron V-3. The plate circuit of thyratron V-3 extends from the A.C. power supply line 9 successively through the thyratron, the grid cathode circuit of the ignitron V-4, the parallel arrangement of ballast resistor R-2 and winding 25 of transformer T-1, and conductor 27 to the A.C. power supply line 11. The plate circuit of ignitron V-4 extends from the A.C. power supply line 9 successively through the ignitron, the parallel arrangement of resistor R-2 and winding 25 of transformer T-1, and conductor 27 to the A.C. power supply line 11.

Details of the phase shifter circuits 5 and 21 which are preferably identical in design and function are shown in FIG. 2 of the drawing. As shown therein, conductors 9 and 11 from the 60 cycle A.C. power supply drive the primary winding 29 of transformer T-2. Condenser C-1 and variable resistor R-3 are series connected across the secondary winding 31 of transformer T-2. The center tap of winding 31 is grounded. The junction of condenser C-1 and resistor R-3 is coupled to the control grid of thyratron V-5 through condenser C-2 and resistor R-4. The junction of condenser C-2 and resistor R-4 is connected to the negative bias voltage supply line 33 through resistor R-5. The plate circuit of thyratron V-5 extends from the positive voltage power supply line 35 successively through resistor R-6, resistor R-7 and the tube to ground. Condenser C-3 is connected between the junction of resistors R-6 and R-7 and ground. The junction of resistors R-6 and R-7 is also coupled to the control grid of triode V-6 through condenser C-4 and resistors R-8 and R-9. The control grid of triode V-6 is also coupled to ground through resistor R-10 control switch 36 and either programmer 3 or 23 or the variable arm of resistor R-11 which is connected between the negative bias voltage supply line 33 and ground. The plate circuit of triode V-6 extends from the positive voltage supply line 35 successively through resistor R-12, the tube, and resistor R-13 to ground. The plate of triode V-6 is coupled to the control grid of triode V-7 through condenser C-5 and resistor R-14. The plate circuit of triode V-7 extends from the positive voltage supply line 35 successively through resistor R-15, the tube, and resistor R-13 to ground. The plate of triode V-7 is coupled to the control grid of triode V-8 through condenser C-6 and resistor R-16. The plate circuit of triode V-8 extends from the positive voltage power supply line 35 successively through the tube and resistor R-17 to ground. The cathode of triode V-8 is coupled to the control grid of thyratron V-1 or thyratron V-3 through condenser C-7 and resistor R-18.

In operation the condenser C-3 in phase shifter 5 alternately charges through resistor R-6 and discharges through thyratron V-5. The parameters of charging and discharging circuits for condensers C-3 are selected so as to provide a sawtooth output wave having a frequency of 30 cycles per second or one half that of the A.C. reference voltage on conductors 9 and 11. The sawtooth output wave of condenser C-4 is synchronized with the 60 cycle A.C. voltage on conductors 9 and 11 by adjustment of variable resistor R-3 through which a synchronizing pulse from conductors 9 and 11 is coupled to the grid of thyratron V-5. Triodes V-6 and V-7 and their associated circuits operate as flip-flop type multivibrator circuit. Thus, triode V-6 is normally non-conductive and triode V-7 normally conducts. The grid biasing voltage which normally maintains triode V-6 in its cutoff condition is varied in a predetermined manner by the programmer 3 or by adjustment of the variable arm of resistor R-11 depending upon the position of control switch 36. When the rising sawtooth potential at the grid of triode V-6 exceeds its cutoff voltage, triode V-6 is energized and triode V-7 is deenergized. When this occurs, the increase in potential at the plate of triode V-7 is fed through the cathode follower circuit of triode V-8 to fire thyratron V-1. Energization of thyratron V-1 in turn energizes ignitron V-2 and a heavy surge of current is delivered to the load 19.

Phase shifter 21 controls energization of thyratron V-3 in a manner similar to the way in which phase shifter 5 controls energization of thyratron V-1. Thus, depending upon the programmed biasing voltage of circuit 23 or the manual adjustment of resistor R-11 thyratron V-4 fires at a predetermined point during each cycle of the A.C. reference supply voltage on conductors 9 and 11. When this occurs, ignitron V-4 fires and a potential is developed in the secondary winding of transformer T-1 which is opposite in polarity to the potential applied to the plates of ignitron V-2 and thyratron V-1 and which is sufficient in magnitude to cutoff both tubes. Thus, it will be noted that energization and deenergization of the load circuit during each cycle of the 60 cycle reference voltage is readily and conveniently controlled respectively by adjustment of phase shifters 5 and 21. It will also be noted that control of the D.C. power delivered to the load may be simultaneously adjusted by two independent external control systems which in the embodiment of the invention described herein take the form of programmers 3 and 23.

Obviously many modifications and variations of the present invention are possible in the light of the above teachings. It is therefore to be understood that within the scope of the appended claims the invention may be practiced otherwise than as specifically described.

What is claimed is:

1. Apparatus for controlling the application of direct current energy to a load said apparatus comprising:
   (a) a source of direct current energy;
   (b) an ignitron;
   (c) a transformer having a primary and a secondary winding;
   (d) a circuit that extends from one terminal of the direct current source through the load, the ignitron, and the secondary winding of the transformer to the other terminal of the direct current source;
   (e) an alternating current source;
   (f) means coupled to the alternating current source for controlling energization of the ignitron at a predetermined instant during each cycle of the alternating current source;
   (g) and means coupled to the alternating current source for controlling energization of the primary winding of the transformer at a predetermined instant during each cycle of the alternating current source.

2. Apparatus for controlling the application of direct current energy to a load said apparatus comprising:
   (a) a source of direct current energy;
   (b) an ignitron;
   (c) a transformer having a primary and a secondary winding;
   (d) a circuit that extends from one terminal of the direct current source through the load, the ignitron, and the secondary winding of the transformer to the other terminal of the direct current source;
   (e) an alternating current source;
   (f) a phase shift circuit coupled to the alternating current source;
   (g) means for controlling the phase shift circuit such that it provides an output pulse at any selected instant during each cycle of the alternating current source;
   (h) means responsive to the occurrence of the output pulse of the phase shift circuit for firing the ignitron;
   (i) and means coupled to the alternating current source for controlling energization of the primary winding of the transformer at a predetermined instant during each cycle of the alternating current source.

3. Apparatus for controlling the application of direct current energy to a load said apparatus comprising:
   (a) a source of direct current energy;
   (b) an ignitron;
   (c) a transformer having a primary and a secondary winding;
   (d) a circuit that extends from one terminal of the direct current source through the load, the ignitron, the secondary winding of the transformer to the other terminal of the direct current source;
   (e) an alternating current source;
   (f) a first phase shift circuit coupled to the alternating current source;
   (g) means for controlling the first phase shift circuit such that it provides an output pulse at any selected instant during each cycle of the alternating current source;
   (h) means responsive to the occurrence of the output pulse of the first phase shift circuit for firing the ignitron;
   (i) a second phase shift circuit coupled to the alternating current source;
   (j) means for controlling the second phase shift circuit such that it provides an output pulse at a selected instant during each cycle of the alternating current source;
   (k) means responsive to the occurrence of the output pulse of the second phase shift circuit for energizing the primary winding of the transformer and cutting off the ignitron.

4. Apparatus for controlling the application of direct current energy to a load said apparatus comprising:
   (a) a source of direct current energy;
   (b) an ignitron;
   (c) a transformer having a primary and a secondary winding;
   (d) a circuit that extends from one terminal of the direct current source through the load, the ignitron, and the secondary winding of the transformer to the other terminal of the direct current source;
   (e) means including a thyratron circuit for firing the ignitron;
   (f) an alternating current source;
   (g) a phase shift coupled to the alternating current source;
   (h) means for controlling the phase shift circuit such that it provides an output pulse at any selected instant during each cycle of the alternating current source;
   (i) means responsive to the occurrence of the output pulse of the phase shift circuit for firing the thyratron circuit;
   (j) and means coupled to the alternating current source for controlling energization of the primary winding of the transformer at a predetermined instant during each cycle of the alternating current source.

5. Apparatus for controlling the application of direct current energy to a load said apparatus comprising:
   (a) a source of direct current energy;
   (b) a first ignitron;

(c) a transformer having a primary and a secondary winding;
(d) a circuit that extends from one terminal of the direct current source through the load, the ignitron, and the secondary winding of the transformer to the other terminal of the direct current source;
(e) means including a first thyratron circuit for firing the ignitron;
(f) an alternating current source;
(g) a first phase shift circuit coupled to the alternating current source;
(h) means for controlling the first phase shift circuit such that it provides an output pulse at any selected instant during each cycle of the alternating current source;
(i) means responsive to the occurrence of the output pulse of the first phase shift circuit for firing the thyratron circuit;
(j) a second ignitron;
(k) means including a second thyratron circuit for firing the second ignitron;
(l) a second phase shift circuit coupled to the alternating current source;
(m) means for controlling the second phase shift circuit such that it provides an output pulse at a selected instant during each cycle of the alternating current source;
(n) means responsive to the occurrence of the output pulse of the second phase shift circuit for firing the second thyratron circuit;
(o) and means responsive to the energization of the second thyratron circuit for energizing the primary winding of the transformer.

6. Apparatus for controlling the application of direct current energy to a load said apparatus comprising:
(a) a source of direct current energy;
(b) a first ignitron;
(c) a transformer having a primary and a secondary winding;
(d) means electrically connecting the source, the load, the ignitron, and the secondary winding of the transformer in series;
(e) means including a first thyratron circuit for firing the ignitron;
(f) an alternating current source;
(g) a sawtooth generator, the frequency of said generator being one half that of the alternating source;
(h) means synchronizing the output of the generator with that of the alternating current source;
(i) a one-shot multivibrator circuit;
(j) means for controlling the cutoff bias of the normally non-conducting half of the multivibrator circuit;
(k) means for coupling the output of the sawtooth generator to the multivibrator circuit so as to modify the cutoff bias on the non-conducting half of the multivibrator circuit and linearly increase its effective potential until conduction occurs;
(l) means for energizing the first thyratron circuit when energization of the normally non-conducting half of the multivibrator circuit occurs;
(m) a second ignitron;
(n) means including a second thyratron circuit for firing the second ignitron;
(o) a phase shift circuit coupled to the alternating current source;
(p) means for controlling the second phase shift circuit such that it provides an output pulse at a selected instant during each cycle of the alternating current source;
(q) means responsive to the occurrence of the output pulse of the second phase shift circuit for firing the second thyratron circuit;
(r) and means responsive to the energization of the second thyratron circuit for energizing the primary winding of the transformer.

References Cited by the Examiner
UNITED STATES PATENTS

| | | | |
|---|---|---|---|
| 2,248,968 | 7/41 | Dawson | 323—38 |
| 2,773,184 | 12/56 | Rolf | 328—59 |
| 3,114,055 | 12/63 | Kalfaian | 307—88.5 |

LLOYD McCOLLUM, *Primary Examiner.*